Sept. 22, 1936.  W. KLATT  2,055,235
PHOTOGRAPHIC ENLARGEMENT APPARATUS
Original Filed July 29, 1933
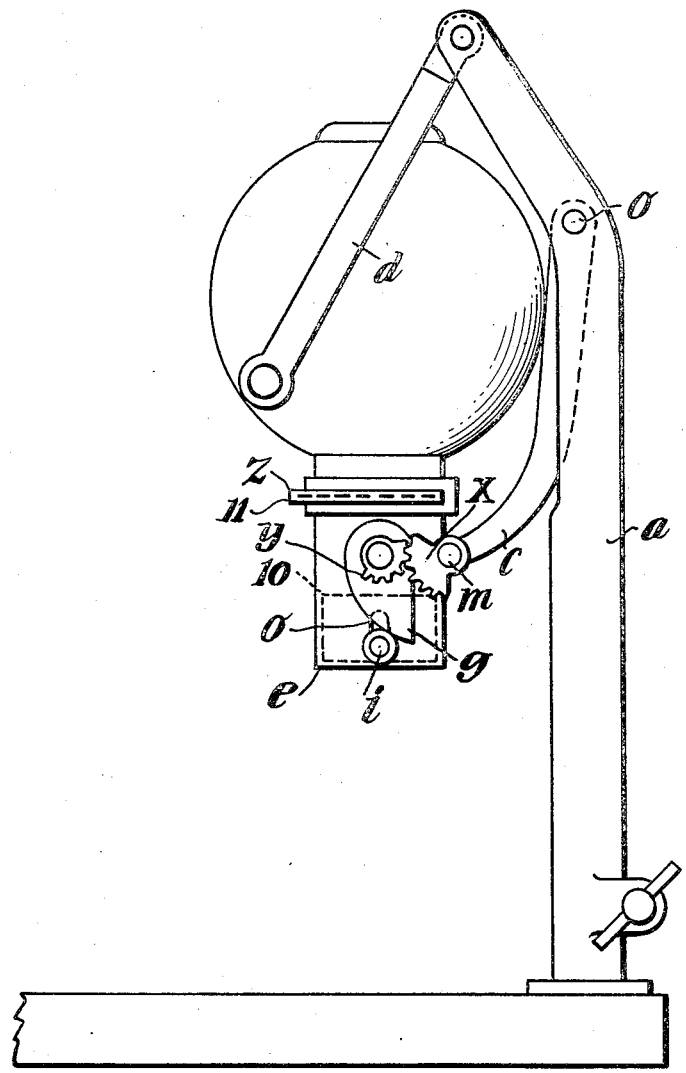
Inventor:
Walter Klatt
by George C. Heinisch
Attorney.

Patented Sept. 22, 1936

2,055,235

UNITED STATES PATENT OFFICE 2,055,235

PHOTOGRAPHIC ENLARGEMENT APPARATUS

Walter Klatt, Feuerbach, near Stuttgart, Germany, assignor to Ernst Leitz Optische Werke, Wetzlar, Germany Original application July 29, 1933, Serial No. 682,780. Divided and this application February 17, 1934, Serial No. 711,689

1 Claim. (Cl. 88—24)

This invention relates to improvements in photographic enlargement apparatus, as for instance described in my co-pending application Serial No. 682,780 filed July 29, 1933, of which this application is a division, and it is the principal object of my invention to provide such an apparatus with a cam controlled automatic regulation of the objective to the sharpest focus.

The object of the present invention is to provide an apparatus equipped with two segments, one of which has the form of a regulator cam which directly influences the objective setting or a pin of the same equipped with a roller to produce a real automatic adjustment for a large enlargement of the smallest film pictures.

These and other objects and advantages of my invention will become more fully known as the description thereof proceeds, and will then be more specifically defined in the appended claim.

In the accompanying drawing forming a material part of this disclosure:

The single figure on the drawing illustrates a fragmentary side view of an apparatus equipped with an objective movement constructed according to my invention.

As illustrated, the lever arm $c$ which at its outer end is pivotally secured to a standard intermediate the ends thereof as for instance disclosed in my co-pending application Serial No. 682,780, filed July 29, 1933, and is pivoted at its inner end as at $m$ and formed into a toothed segment $x$ in mesh with a toothed segment $y$ integral with a cam $g$, engaging the roller $i$ the spindle of which projects through a slot $o$ in the housing $e$ for the objective setting indicated in broken lines at $10$ and which may be of any suitable construction, well known in the art, and displacing the same against the pressure of the well known objective controlling spring.

In operation, the cam $y$ under the influence of the movement of the lever arms $c$ and $a$ will engage the roller $i$, the spindle pin of which is guided in the slot $o$ of the objective setting to focus the same for the correct enlargement of a small film negative and sensitized material holder $11$ on a support $z$ according to the angular positions of the lever arm aggregate.

It will be understood that I have described and shown the preferred form of my invention as example of the many possible ways to practically construct my invention, and that I may make such changes in the general arrangement and in the construction of the minor details of my invention as come within the scope of the appended claim without departure from the spirit of my invention and the principles involved.

Having thus described my invention what I claim as new and desire to secure by Letters Patent is:

In an enlargement camera particularly for cinema negatives, a means for automatically focusing the camera objective in its slotted housing comprising a pivoted arm, a segment formed at one end of said arm, a cam pivoted to the slotted housing for the objective setting, a segment integral with said cam and in mesh with the segment on said arm, a roller having its spindle projecting through the slot in said housing adapted to be engaged and operated by said cam during the operation thereof according to the operation of said lever arm to focus the objective setting within its housing accordingly.

WALTER KLATT.